H. LIECHTY.
AXLE FOR AUTOMOBILES.
APPLICATION FILED APR. 29, 1913.
1,136,348.
Patented Apr. 20, 1915.
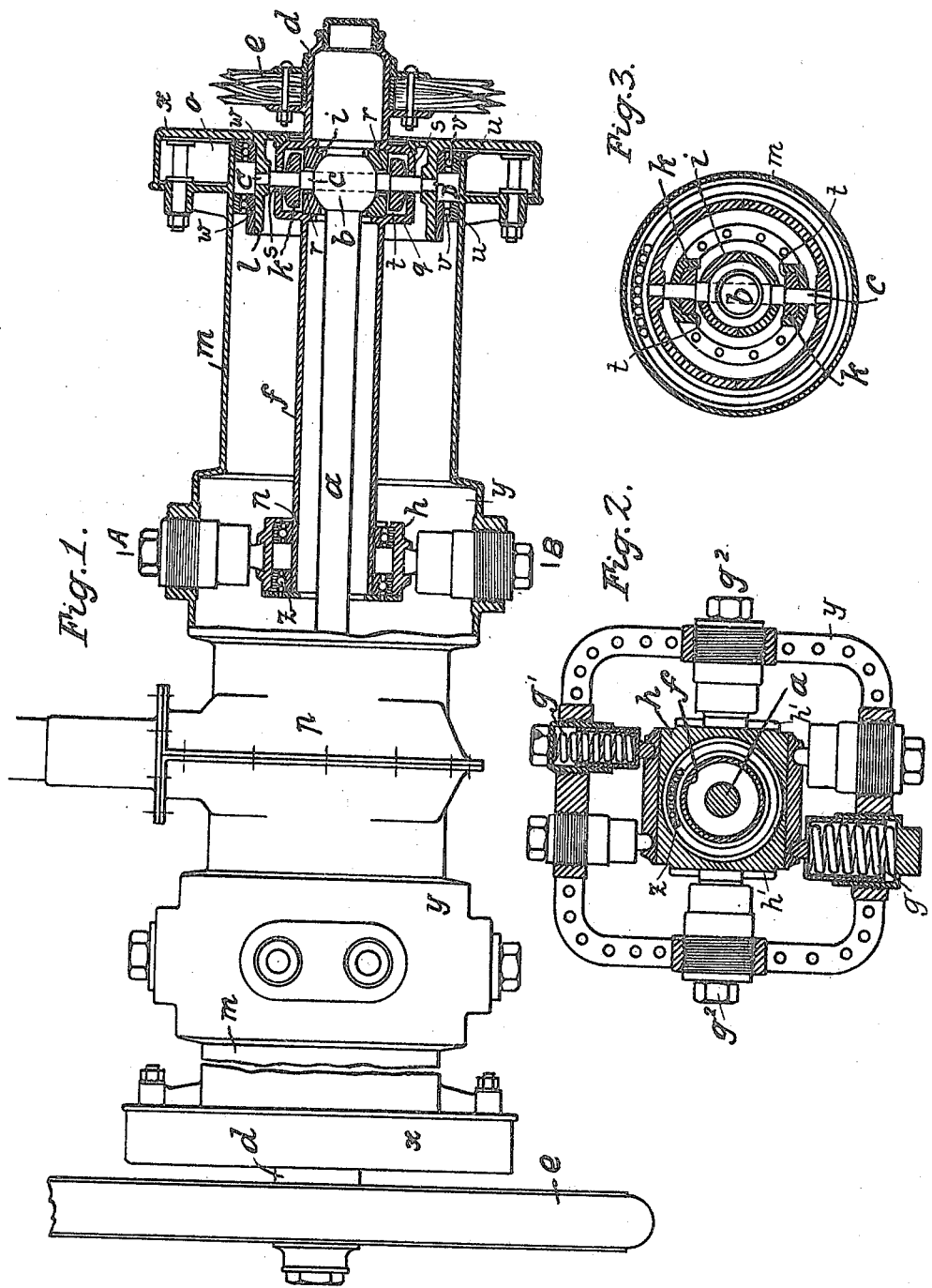

UNITED STATES PATENT OFFICE.

HERMANN LIECHTY, OF BERNE, SWITZERLAND.

AXLE FOR AUTOMOBILES.

1,136,348.  Specification of Letters Patent.  Patented Apr. 20, 1915.

Application filed April 29, 1913. Serial No. 764,302.

*To all whom it may concern:*

Be it known that I, HERMANN LIECHTY, a citizen of the Republic of Switzerland, residing at 15 Dapples Weg, Berne, in the Republic of Switzerland, have invented a new and useful Axle for Automobiles, of which the following is a specification.

My invention relates to a novel axle for automobiles, the two spindles of which axle are spring-pressed for obtaining a soft motion of the vehicle.

The chief feature of the novel axle consists in that the two spindles for receiving the two wheels are no longer made in one with the axle, but are pivotally connected therewith, while springs are inserted between the axle and arms or parts of the spindles, which latter may be either solid or tubular, so that the axle proper together with the two spindles no longer forms a rigid structure but forms an elastic system capable of supporting the load.

In the accompanying drawing: Figure 1, is a plan partly in section through a rear axle for automobiles embodying my invention; Fig. 2, a vertical cross section on line A—B, Fig. 1, and Fig. 3, a similar cross section on line C—D, Fig. 1.

In the rear axle for automobiles either axle proper $a$ has at the outer end a ball $b$ and is at the inner end in any known manner connected with the differential gear contained in the middle casing $p$. Either spindle $d$ is made tubular and is connected with a casing $q$ of any known construction and having a long inner tubular arm $f$. The casing $q$ contains brasses $i$ which fit the surface of the ball $b$ and can turn on the same through a certain angle in all directions. A cross pin $c$ passes through the ball $b$ and through opposite slots $r\,r$ in the brasses $i$ and through opposite slots $s\,s$ in the casing $q$. The casing $q$ has formed in it two opposite chambers $t\,t$ for two collars $k\,k$ provided with spherical outer surfaces and disposed on suitable shoulders of the cross pin $c$, as shown. The tubular spindle $d$ is rigidly connected with the appertaining wheel $e$ and therefore partakes in the revolution of the latter. A tubular round shell or casing $m$ (Fig. 3) contains at the outer end on the inside two parallel outer race rings $u\,u$ with annular grooves, in which small balls $v\,v$ are made to roll. A hollow brake disk $x$ is made to close the casing $m$ and has an inner tubular projection $l$ concentric with the axle $a$. The projection $l$ carries two parallel inner race rings $w\,w$ with annular grooves for the balls $v\,v$. The cross pin $c$ is set off at the two ends, which engage in corresponding opposite holes in the tubular projection $l$. It will be now understood, that the power received from the motor through the differential gear in the middle casing $p$ will be transmitted by the axle $a$ on either side through the cross pin $c$ on the one hand to the casing $q$ and thereby to the spindle $d$ and the rear wheel $e$ and on the other hand to the tubular projection $l$ and thereby to the brake disk $x$, so that the ball $b$ of the axle $a$ will be supported by means of a ball bearing formed by the parts $u\,u$, $v\,v$, $w\,w$. The brake disk $x$ is made to bear in any known manner on the casing $q$ and contains a brake $o$ of any known construction, which I do not describe here, as it is immaterial to my invention.

The tubular casing $m$ connected with the already mentioned middle casing $p$ contains a square widening $y$ for supporting two lower large helical springs $g$, two upper small helical springs $g^1$ and two opposite large helical springs $g^2$ (Fig. 2). The inner ends of all of these helical springs $g$ $g^1$ $g^2$ are made to bear by means of suitable parts against the four sides of a square frame $h$, which is made to turn on the inner end of the tubular arm $f$ by means of a ball-bearing $z$ of any known construction. The lower helical springs $g$ are to take up the force produced by the resistance of the ground acting upward on the wheel $e$, the spindle $d$ serving as the short arm and the tubular arm $f$ as the long arm of a two-armed lever rocking by means of the brasses $i$ on the ball $b$ of the axle $a$. The upper helical springs $g^1$ serve for damping of softening the vibrations of the lower helical springs $g$ due to shocks. The lower and upper helical springs $g$ $g^1$ are so adjusted as to bring the lever $d$ $f$ under normal load into the central line of the axle $a$. Guides $h^1$ $h^1$ provided on the vertical sides of the square frame $h$ for the respective parts pressed against these sides by the horizontal springs $g^2$ permit the tubular arm $f$ to vertically rock on the ball $b$. The two middle helical springs $g^2$ are to take up the horizontal vibrations of the inner end of the tubular arm $f$. The casing $m\,m$ is to support the carriage frame in any known manner.

I claim:

1. In an automobile, an axle, a wheel-spindle, a ball bearing between axle and spindle, a pivotal connection likewise between said axle and spindle, a tubular arm connected to the spindle and encompassing the axle, a relatively fixed member, and springs interposed between the tubular arm and member.

2. In an automobile, an axle, a wheel-spindle, a casing on said spindle, collars having spherical faces and interposed between said casing and axle, a tubular arm on said casing that encompasses the axle, a tubular shell encompassing the tubular arm, a plurality of springs carried by said shell, and a frame engaged by the springs and rotatably mounted on the tubular arm.

3. In an automobile, an axle having a ball near its outer end, a wheel spindle, a casing on said spindle, collars in the casing that engage the ball, a pin passing through the ball and engaging the casing, a tubular arm on the casing that encompasses the axle, a relatively fixed member, and springs interposed between the tubular arm and member.

HERMANN LIECHTY.

Witnesses:
E. Pez,
Rich Ammann.

Copies of this patent may be obtained for five cents each, by addressing the "Commissioner of Patents, Washington, D. C."